US007281463B2

(12) United States Patent
Pfaff, Jr.

(10) Patent No.: US 7,281,463 B2
(45) **Date of Patent: *Oct. 16, 2007**

(54) ROTARY CUTTING TOOL WITH DIE PLATE POSITION ADJUSTMENT

(76) Inventor: Alan R. Pfaff, Jr., 3512 Mac Nichol Trial, Orchard Lake, MI (US) 48323

( * ) Notice: Subject to any disclaimer, the term of this patent is extended or adjusted under 35 U.S.C. 154(b) by 0 days.

This patent is subject to a terminal disclaimer.

(21) Appl. No.: 11/297,914

(22) Filed: Dec. 9, 2005

(65) Prior Publication Data

US 2006/0086229 A1 Apr. 27, 2006

Related U.S. Application Data

(62) Division of application No. 10/730,580, filed on Dec. 8, 2003, now Pat. No. 7,000,522.

(51) Int. Cl.
*B23D 25/12* (2006.01)

(52) U.S. Cl. ...................................... 83/698.42; 83/345

(58) Field of Classification Search .......... 83/331-349, 83/698.42, 659, 347; 101/382.1, 383, 415.1; 72/195, 482.3

See application file for complete search history.

(56) References Cited

U.S. PATENT DOCUMENTS

| | | | | |
|---|---|---|---|---|
| 3,122,048 | A | 2/1964 | Warner | |
| 3,752,042 | A * | 8/1973 | Castille | 493/471 |
| 4,789,287 | A | 12/1988 | Le | |
| 5,088,367 | A | 2/1992 | Cracchiolo et al. | |
| 5,365,815 | A | 11/1994 | Pfaff, Jr. | |
| 5,417,132 | A | 5/1995 | Cox et al. | |
| 5,697,277 | A * | 12/1997 | Okonski et al. | 83/522.15 |
| 5,842,399 | A | 12/1998 | Pfaff, Jr. | |
| 6,085,626 | A | 7/2000 | Pfaff, Jr. | |
| 6,178,852 | B1 | 1/2001 | Pfaff, Jr. | |

* cited by examiner

*Primary Examiner*—Kenneth E. Peterson
*Assistant Examiner*—Isaac Hamilton
(74) *Attorney, Agent, or Firm*—Miller, Canfield, Paddock and Stone; Robert K. Roth

(57) ABSTRACT

A rotary cutting tool with easy to adjust rotary die plates comprises a rotary die cylinder, a die plate adjustably mounted to the rotary die cylinder, an external eccentric mounted on the rotary die cylinder having a first axis of rotation with respect to the cylinder and having a central opening offset from the first axis, and an internal eccentric mounted in the central opening. Rotation of the external eccentric urges the internal eccentric to move with respect to the cylinder, and the die plate moves in response to motion of the internal eccentric.

13 Claims, 5 Drawing Sheets

ROTARY CUTTING TOOL WITH DIE PLATE POSITION ADJUSTMENT

CROSS-REFERENCE TO RELATED APPLICATION

This application is a divisional application of and claims priority from application Ser. No. 10/730,580 filed on Dec. 8, 2003, now U.S. Pat. No. 7,000,522 published on Feb. 21, 2006.

FIELD OF THE INVENTION

This invention relates to improvements in rotary cutting tools, and more particularly to improvements in control of the position of a die plate on the rotary cutting tool.

BACKGROUND OF THE INVENTION

Rotary cutting tools are useful for cutting thin material such as, for example, paper, paperboard, cardboard, plastic film, metal foil, thin sheet metal, etc. Typically such thin material is positioned between a pair of die plates mounted on corresponding rotating die cylinders. The thin material may be received on a large roll and fed between the rotating dies for high volume production of cut blanks.

It is important that the die plates be properly affixed to the cylinder and aligned, both with respect to the cylinder and with respect to each other. This is especially important given the speed of rotation of the die cylinders associated with high volume production. Known techniques for affixing and aligning the die plates include forming the die plate and die cylinders out of a magnetic material so that they are magnetically attracted to one another. However, such a design greatly increases the costs of the die cylinders. It would be highly desirable to have a rotary cutting tool which did not require the use of a magnetic cylinder to affix and to control the position of the die plate.

SUMMARY OF THE INVENTION

In accordance with a first aspect, a rotary cutting tool comprises a rotary die cylinder, a die plate adjustably mounted to the rotary die cylinder, an external eccentric mounted on the rotary die cylinder having a first axis of rotation with respect to the cylinder and having a central opening offset from the first axis, and an internal eccentric mounted in the central opening. Rotation of the external eccentric urges the internal eccentric to move with respect to the cylinder, and the die plate moves in response to a combination of rotation of the eccentrics. Adjustment of the eccentrics allows accurate position adjustment of the die plate with respect to the die cylinder.

From the foregoing disclosure and the following more detailed description of various preferred embodiments it will be apparent to those skilled in the art that the present invention provides a significant advance in the technology of rotary cutting tools. Particularly significant in this regard is the potential the invention affords for providing a high quality, low cost rotary cutting tool. Additional features and advantages of various preferred embodiments will be better understood in view of the detailed description provided below.

Figure 1:
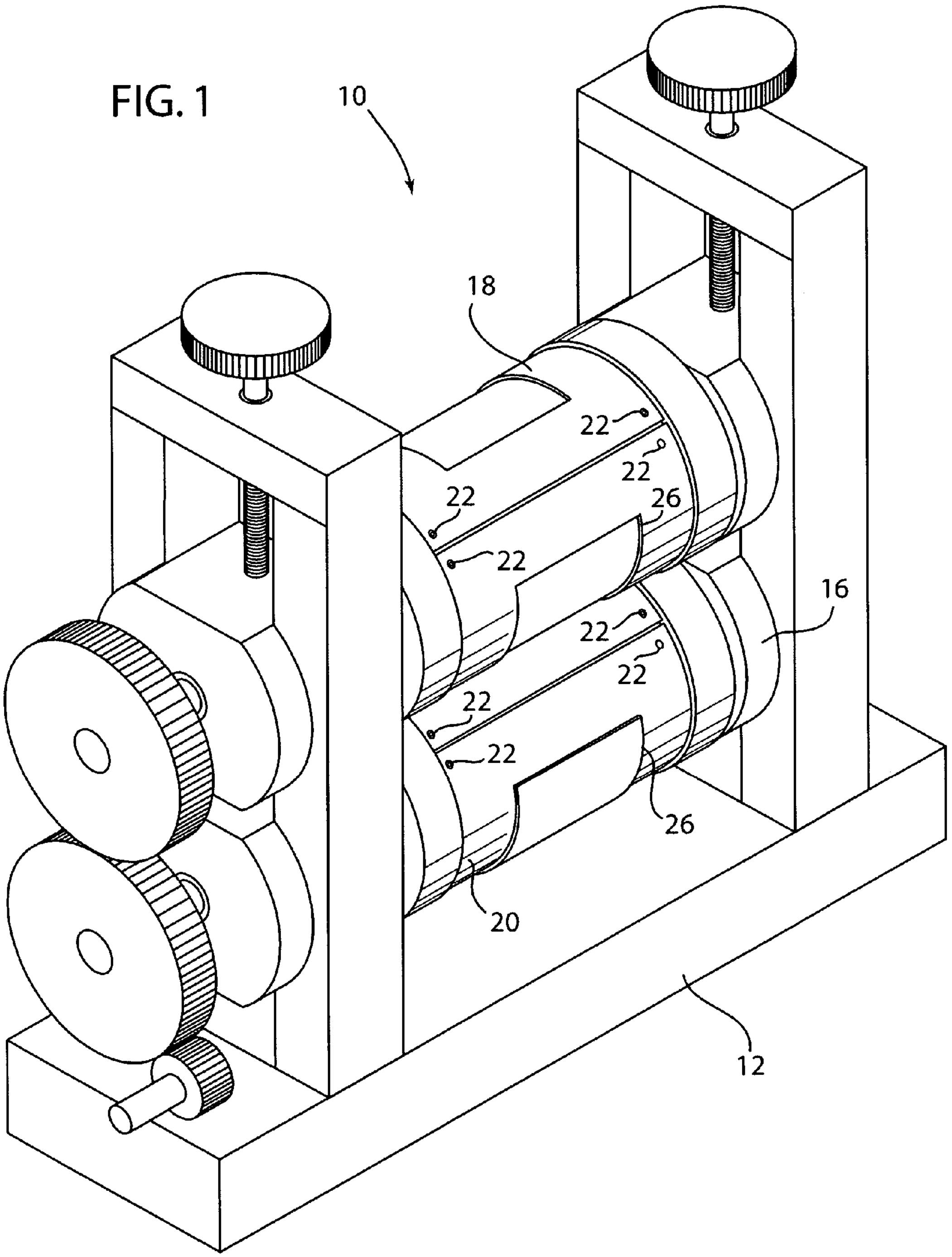
FIG. 1 is a perspective view of a rotary cutting tool in accordance with a preferred embodiment.

It should be understood that the appended drawings are not necessarily to scale, presenting a somewhat simplified representation of various preferred features illustrative of the basic principles of the invention. The specific design features of the rotary cutting tool as disclosed here, including, for example, the specific dimensions of the eccentrics, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the rotary cutting tool disclosed here. The following detailed discussion of various alternative and preferred features and embodiments will illustrate the general principles of the invention with reference to a rotary cutting tool suitable for use in industrial applications where flat paper-like materials are to be cut. Other embodiments suitable for other applications will be apparent to those skilled in the art given the benefit of this disclosure.

Referring now to the drawings, in FIG. 1 shows a rotary cutting tool 10 in accordance with a preferred embodiment. Die cylinders 14, 16 are mounted on a stand 12 so that the cylinder 14, 16 come into close proximity with one another. Wrapped around each die cylinder is a corresponding die plate 18, 20. Each die plate has cutting blades 26. When a thin material is fed between the die plates 26, the blades rotate with the cylinders, cut the thin material, and the thin material is then removed from the cutting area. In certain preferred embodiments one die plate may have a cutting blade 26 and the other die plate may have a counter element which cooperates with the blade to cut the thin material.

Figure 2:
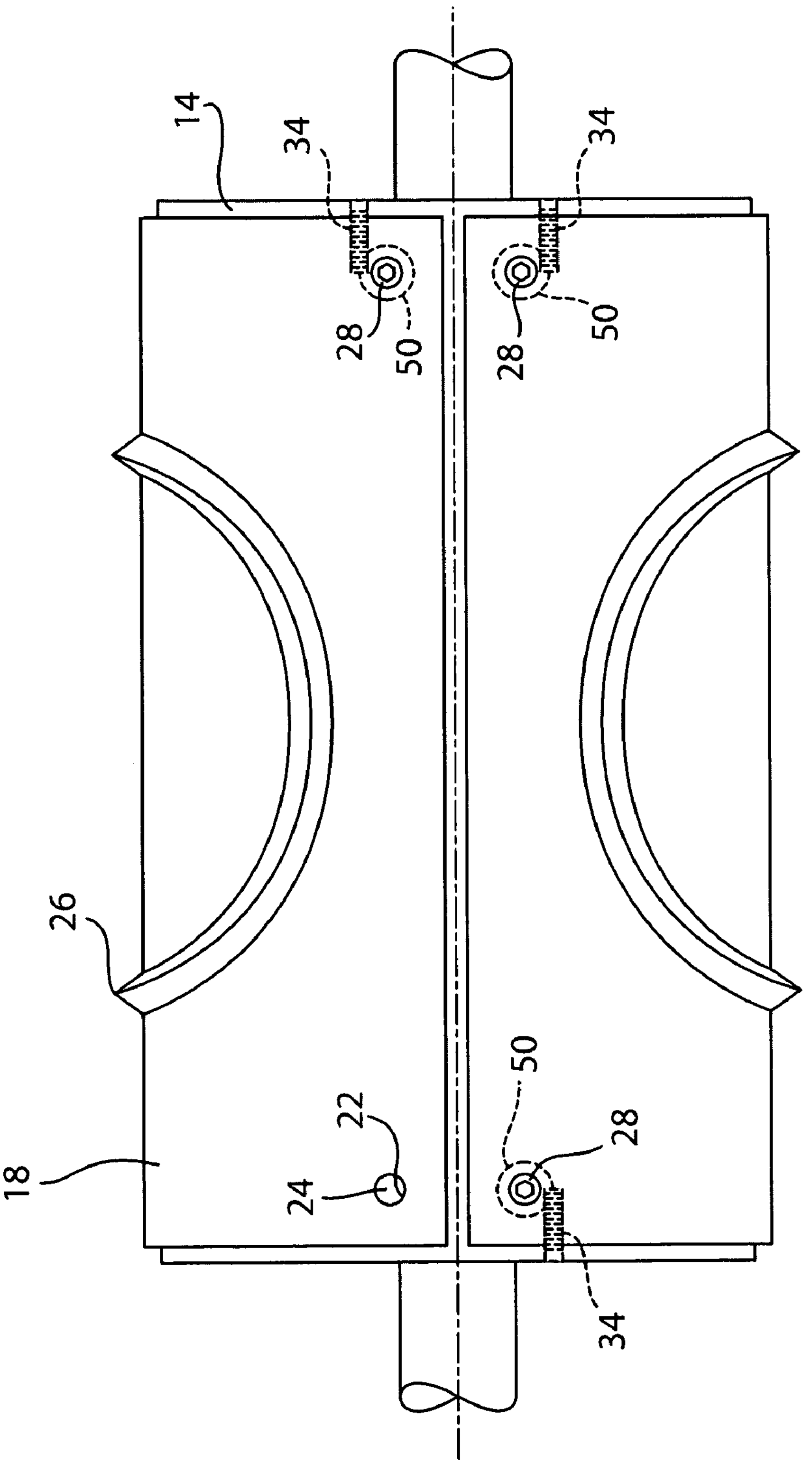
FIG. 2 is a view showing a die plate wrapped around a die cylinder so that the attachments to the die cylinder are near each other.

As seen in FIG. 2, the die plate 18 wraps around the die cylinder 14, and is preferably mounted on the die cylinder at four locations. The die plate 18 position is adjustable with respect to the die cylinder 14 at one or more of these mounting locations. In the preferred embodiment shown in the drawings the die plates are provided with four openings 22. Into one of these openings extends a pin 24 fixed to the cylinder, providing a fixed mounting and reference location. The other three openings are at adjustable mounting locations, described in greater detail below. Other combinations of fixed mounting locations and adjustable mounting locations will be readily apparent to those skilled in the art given the benefit of this disclosure.

Figure 3:
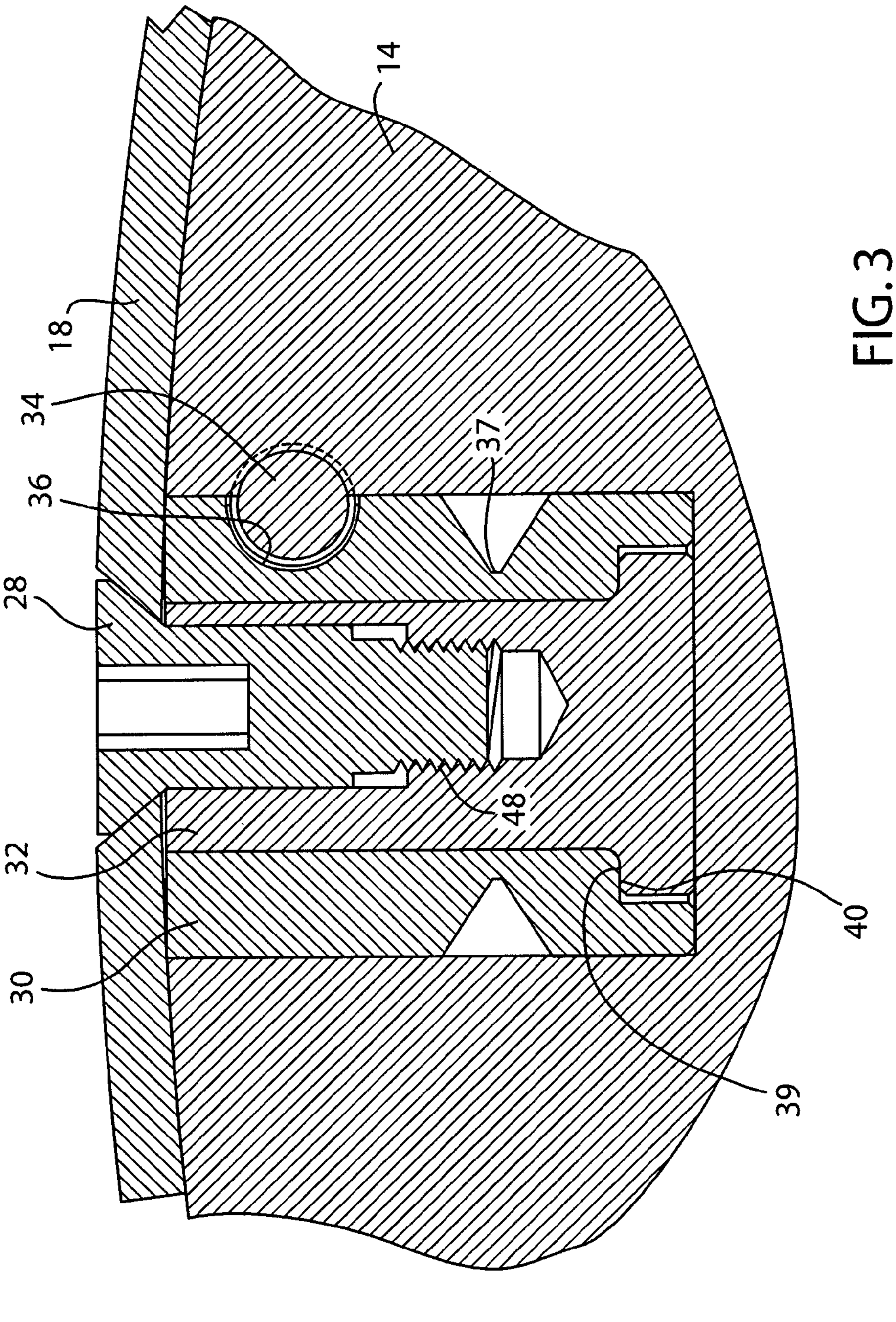
FIG. 3 is a cross section view taken through an opening holding an outer eccentric and an internal eccentric for adjustment of the position of the die plate with respect to the die cylinder.

FIG. 3 shows a cross section view of one of the adjustable mounting locations. Generally aligned with the opening 22 of the plate is an opening or recess 50 in the die cylinder 14. An external eccentric 30 fits into this recess 50, and is rotatable about a first axis 99 (shown in FIG. 5) extending generally radially from the die cylinder, and generally perpendicular to the die plate. A set screw 34 engages an external surface 36 of the external eccentric 30. Rotation of the set screw 34 causes the external eccentric 30 to rotate about the first axis 99. The external eccentric is also provided with an external groove 37 which could, for example, receive a bearing and a retaining screw (not shown) or other retaining device to help retain the external eccentric in the recess 50 but permit rotational movement about the first axis.

Figure 4:
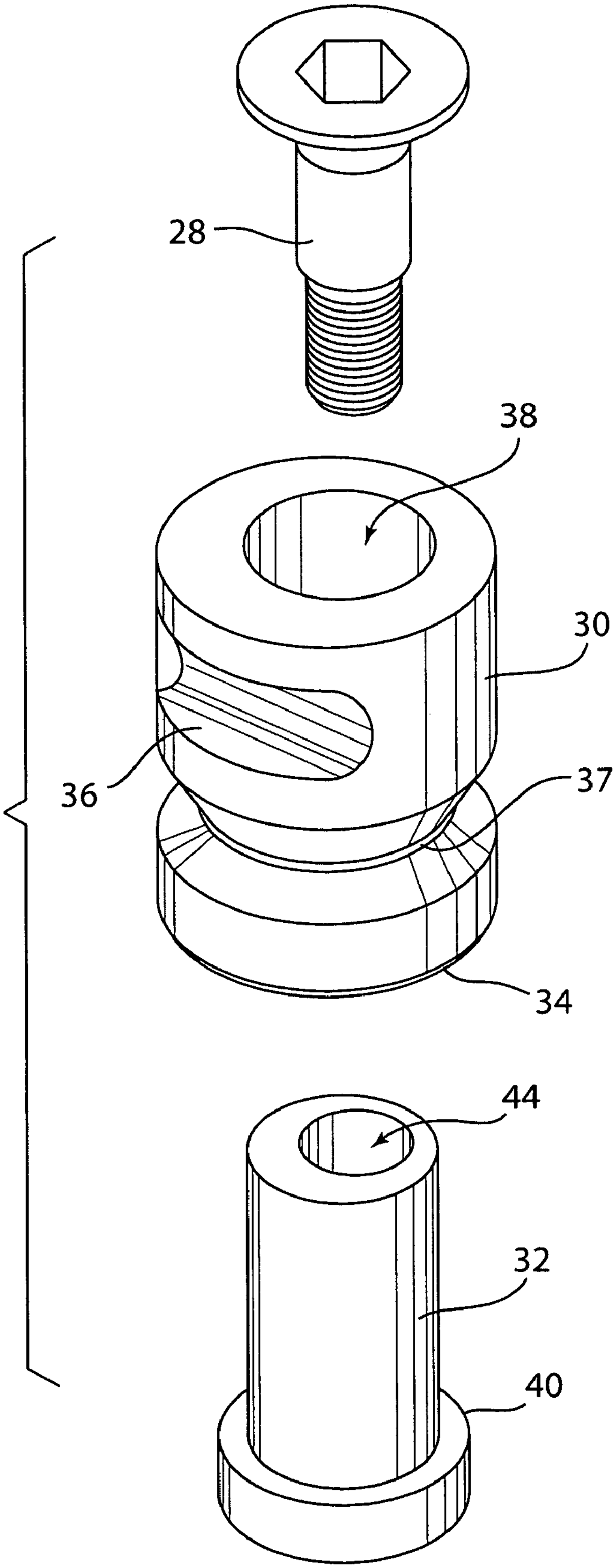
FIG. 4 is a perspective view of the external eccentric, internal eccentric and top fastener as shown in FIG. 3.

As best seen in FIGS. 3-4, the external eccentric 30 may be provided with a central opening 38 and ledge 39 near the bottom of the central opening. An internal eccentric 32 is sized to fit within the central opening 38, and has a base 40 which receives the ledge 39 of the external eccentric 30. Tightening of top fastener 28 pulls base 40 against ledge 39, and sandwiches the die plate 18 so that it moves with the fastener 28. In accordance with a highly advantageous feature, the central opening 38 is offset with respect to the first axis so that the internal eccentric 32 is rotatable about a second axis 98 (see FIG. 5), different from the first axis 99.

The internal eccentric 32 is operatively connected to the die plate 18 by a top fastener 28 such as a screw or shoulder bolt. In the preferred embodiment shown in the drawings, the internal eccentric is threaded at 48 to receive the top fastener 28 in an internal opening 44. In accordance with another highly advantageous feature, the internal opening 44 is offset from the second axis and the top fastener is therefore offset from the second axis and centered at 97 (see FIG. 5). The eccentrics cooperate not only to provide a range of adjustment of the die plate, but also maintain tension in the die plate once set to a desired position.

Figure 5:
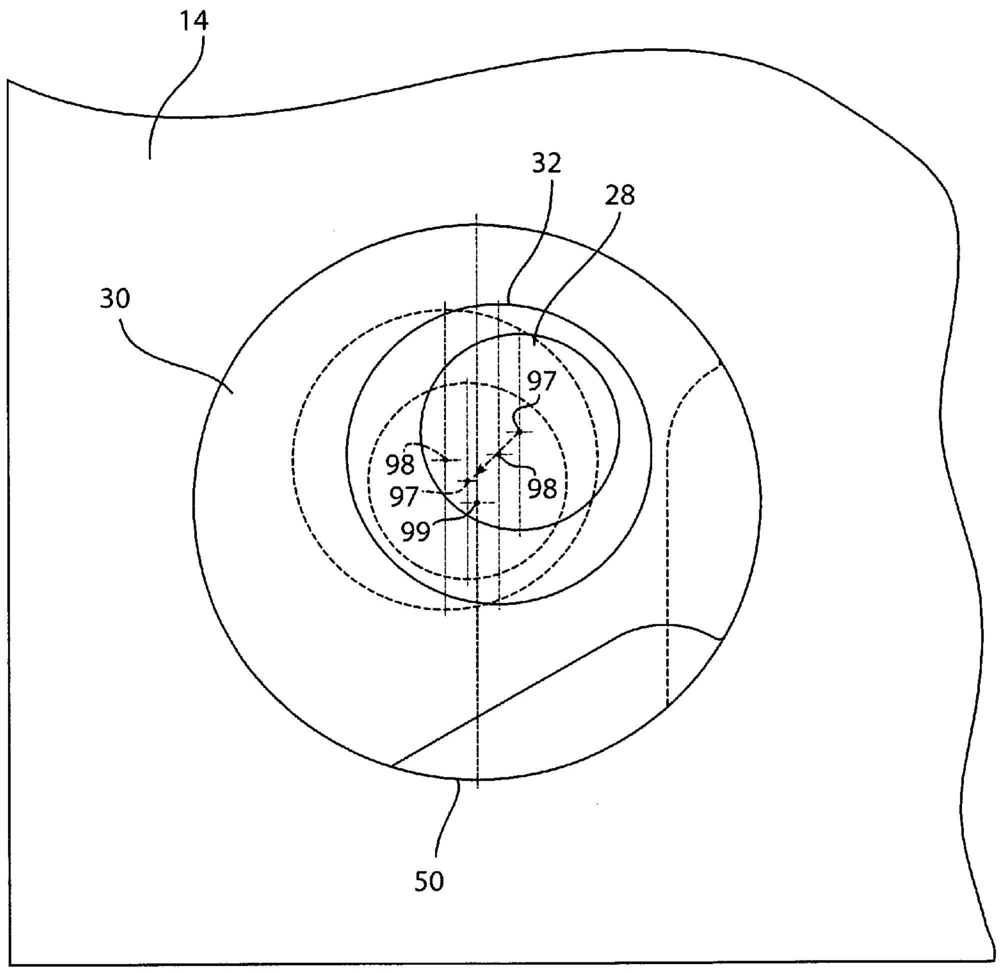
FIG. 5 is a schematic view showing relative motion of a top fastener with respect to both the internal eccentric and external eccentric.

As shown in the schematic view of FIG. 5, because the second axis 98 is offset from the first axis 99, the internal eccentric 32 moves along an arc with respect to the first axis. Similarly, because the top fastener 28 is offset with respect to the second axis, the top fastener 28 moves along an arc with respect to the second axis. As these two motions occur simultaneously, their motion is combined to allow for translation of the top fastener 28 with respect to the external eccentric and in turn, translational motion of the die plate 18 with respect to the die cylinder 14 (shown by the arrows in FIG. 2). Use of the eccentrics to create such elegant position adjustment advantageously eliminates the need for incorporating magnetic materials into the die cylinder, the die plate, or both. Further, use of such eccentrics provides a range of positions to accommodate positional error in the die cylinder mounting holes 50 which receive the eccentrics and positional error in the die plate locating holes 22.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A rotary cutting tool comprising, in combination:

a flexible die plate having a plurality of openings;

a second flexible die plate;

wherein each flexible die plate is bent into a generally cylindrical shape and cutting blades extending from each die plate are adapted to cooperate with one another to cut thin material;

an external eccentric sized to engage the flexible die plate at one of the openings, the external eccentric having a first axis of rotation, wherein rotation about the first axis of rotation provides fine position adjustment of the flexible die plate with respect to the second flexible die plate; and a set screw rotatable about an axis generally perpendicular to the first axis of rotation, wherein rotation of the set screw urges the external eccentric to rotate.

2. The rotary cutting tool of claim 1 wherein the second die plate is adapted to cooperate with the first die plate when mounted on a second rotary die cylinder to cut thin material.

3. The rotary cutting tool of claim 2 wherein each die plate has four openings, and at least two pins are each adapted to fit into a corresponding opening, the at least two pins adapted to cooperate to secure the corresponding die plate to a corresponding die cylinder.

4. The rotary cutting tool of claim 3 wherein each die plate has three corresponding pins.

5. The rotary cutting tool of claim 3 wherein each die plate is generally rectangular and the four openings of each die plate are positioned generally near corners of each die plate.

6. The rotary cutting tool of claim 3 wherein all of the cutting blades are formed as unitary extensions of the die plate.

7. The rotary cutting tool of claim 1 further comprising:

a stand;

a first die cylinder and a second die cylinder, each cylinder mounted on the stand so that the die cylinders are in close proximity to one another;

wherein the die plate is wrapped around the first die cylinder, and the second die plate is wrapped around the second die cylinder.

8. The rotary cutting tool of claim 1 wherein the external eccentric has a central opening offset from the first axis.

9. The rotary cutting tool of claim 8 further comprising an internal eccentric mounted in the central opening and operatively connected to the die plate.

10. The rotary cutting tool of claim 9 further comprising a top fastener which operatively connects the die plate to the internal eccentric.

11. The rotary cutting tool of claim 9 wherein rotation of the external eccentric urges the internal eccentric to rotate about a second axis offset from the first axis.

12. The rotary cutting tool of claim 1 wherein the cutting blades extending from each die plate are formed as unitary extensions of the corresponding die plate.

13. The rotary cutting tool of claim 1 wherein the flexible die plate is operatively connected to a die cylinder by the external eccentric.

* * * * *